United States Patent [19]

Rambauske

[11] 4,277,966

[45] Jul. 14, 1981

[54] METHOD OF MANUFACTURING A FORAMINOUS PLATE

[75] Inventor: Werner R. Rambauske, Carlisle, Mass.

[73] Assignee: Raytheon Company, Lexington, Mass.

[21] Appl. No.: 45,525

[22] Filed: Jun. 4, 1979

[51] Int. Cl.$^3$ ...................... B23P 17/00; B23P 25/00; B21C 47/04

[52] U.S. Cl. ........................................ 72/148; 29/605

[58] Field of Search .............. 29/605, DIG. 33, 527.4; 72/129, 131, 132, 146, 147, 148, 46; 83/875, 879; 242/56.8; 350/311, 318, 320; 356/4

[56] References Cited

U.S. PATENT DOCUMENTS

| | | | |
|---|---|---|---|
| 2,969,585 | 1/1961 | Smith | 29/605 |
| 3,027,628 | 4/1962 | Wilk et al. | 29/605 |
| 3,391,969 | 7/1968 | Ogle | 83/875 X |
| 3,581,389 | 6/1971 | Mori et al. | 72/148 X |
| 3,905,096 | 9/1975 | Tawara et al. | 29/605 |
| 4,068,366 | 1/1978 | Hillesheim | 29/527.4 |
| 4,183,664 | 1/1980 | Rambauske | 356/4 |

*Primary Examiner*—Ervin M. Combs

*Attorney, Agent, or Firm*—Philip J. McFarland; Joseph D. Pannone

[57] ABSTRACT

A method is shown to make a relatively thick foraminous plate wherein the inside of each one of the foramina is treated as desired, the disclosed method comprising the steps of working a strip of a metallic or plastic foil to form transverse grooves, treating the worked strip to cause the surfaces of such grooves to have desired qualities and then rolling the strip (or stacking portions thereof) to form the desired foraminous plate.

3 Claims, 4 Drawing Figures

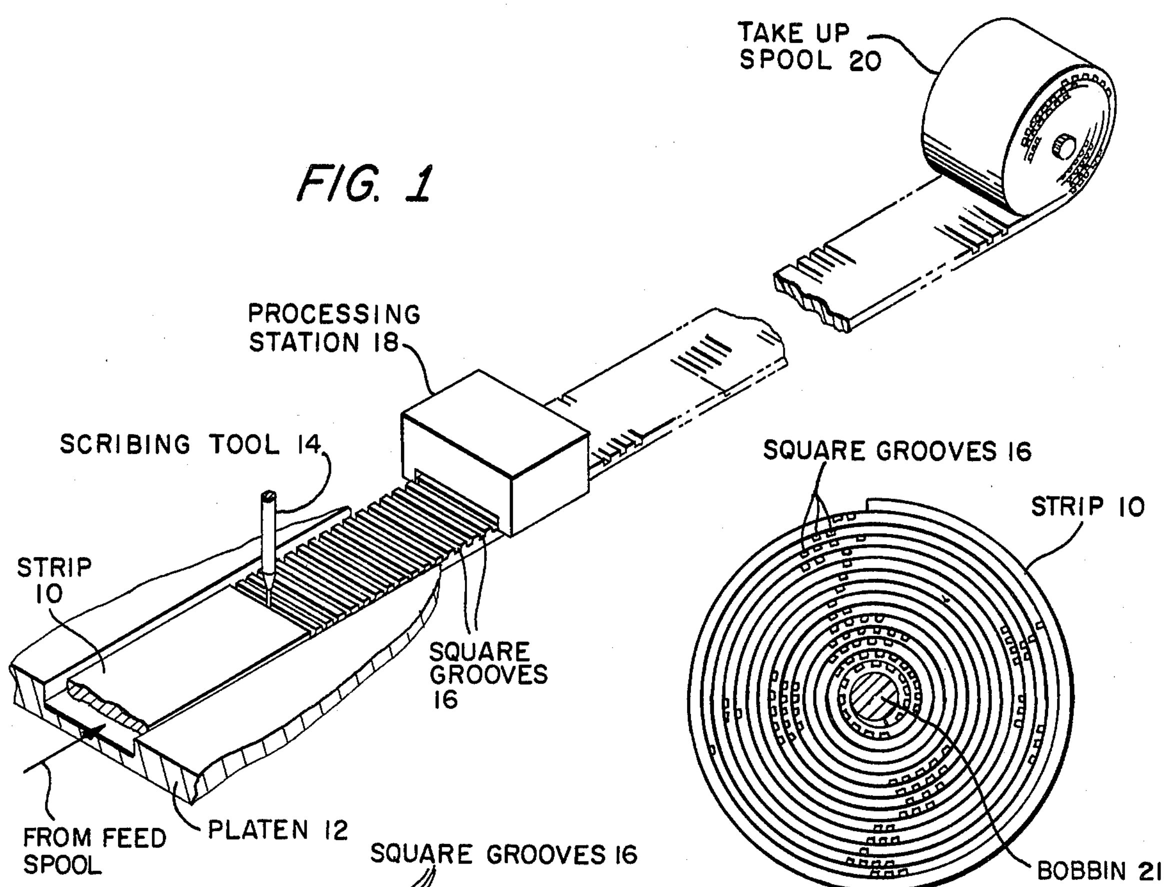
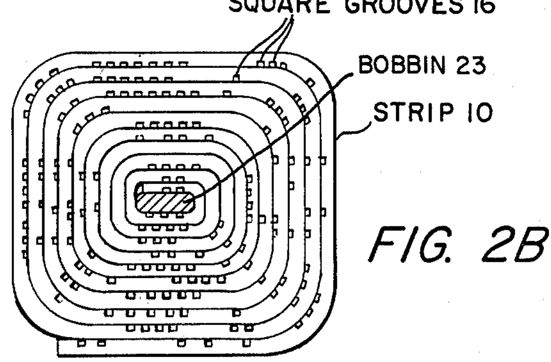
FIG. 2B
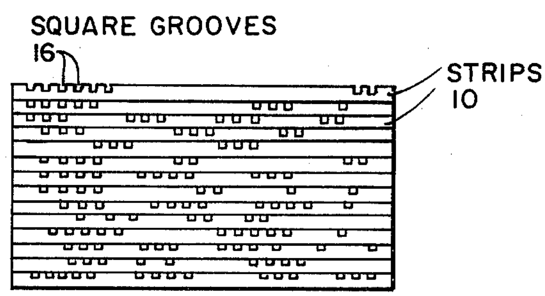
FIG. 2C
(PRIOR ART)

METHOD OF MANUFACTURING A FORAMINOUS PLATE

BACKGROUND OF THE INVENTION

This invention pertains generally to the fabrication of optical elements and particularly to a method of making elements wherein the optical characteristics are controlled.

It has been known for some years in the field of fiber optics that certain lens-like elements (sometimes referred to as "channelplates" or "collimators") may advantageously be used to filter light. For example, in my copending application Ser. No. 726,079 entitled "Optical Apparatus", filed Sept. 23, 1976 U.S. Pat. No. 4,183,664 and assigned to the same assignee as this invention, a foraminous plate wherein the walls of the individual foramina are rendered opaque may be used to pass light originating in a small selected field and to reject light from any point outside such field.

Unfortunately, when the above-mentioned foraminous plate is made according to any known method, it is very difficult and expensive to fabricate a satisfactory plate. The dimensions of the individual ones of the foramina, coupled with the requirement that the inner wall of each foramen be substantially the same as each other one, explain why known methods are difficult and expensive. For example, in a typical case where it is desired to define a field of view with an angular size in the order 1° and each foramen is cylindrical, with a diameter say of $400\times10^{-6}$ inches, the length of each foramen must be approximately $22,800\times10^{-6}$ inches or 0.023 inches in length. For proper operation, the optical characteristics of the wall of each foramen must be the same along its length, i.e. the wall must be totally nonreflective or reflective or have some other desired characteristic. It is manifest, then, that any treatment of the walls of the literally thousands of foramina making up a channelplate of modest size (there being about 202,800 foramina in a channelplate of 1" diameter) is most difficult when, as is now the practice, such foramina are made by drawing bundles of hollow optical tubing or by treating photosensitive glass.

SUMMARY OF THE INVENTION

With the foregoing in mind it is a primary object of this invention to provide an improved method of fabricating a channelplate wherein the surfaces of the foramina in such plate are exposed during fabrication.

Another object of this invention is to provide a method as above wherein the foramina may be formed in materials other than glass or other plastic material.

Still another object of this invention is to provide a method of fabricating a channelplate as above wherein the wall of each foramen may be covered with materials of differing optical characteristics.

The foregoing and other objects of this invention are attained by following the method generally characterized by scribing parallel indentations across the complete width of a tape-like base of a selected material, then treating the surfaces of such tape-like base in accordance with an optical characteristic desired for a completed channelplate and then either winding a scribed and treated strip or stacking a plurality of such strips to form a channelplate of a desired size.

BRIEF DESCRIPTION OF THE DRAWINGS

For a more complete understanding of this invention reference is now made to the following description of the herein-contemplated method and to the accompanying drawings wherein:

FIG. 1 is a simplified sketch showing generally the steps of the contemplated method; and FIGS. 2A, 2B and 2C are end views showing typical shapes of channelplates made according to the contemplated method.

DESCRIPTION OF THE PREFERRED EMBODIMENTS

Referring now to FIG. 1, it may be seen that a tape-like base, hereinafter referred to as a strip 10, is pulled from a feed roll (not shown) in any convenient manner (not shown) to a position on a platen 12 under a scribing tool 14. For expository reasons it will be assumed here that the strip 10 is aluminum foil with a thickness of 100 microns and a width of 5 centimeters. It will be obvious, as the description of the invention proceeds, that materials other than aluminum foil may be used and that the dimensions of the strip 10 may be changed. That is to say, depending upon the chosen way in which the strip 10 is to be worked and the desired configuration of the final product, other materials (including various kinds of plastics) having appropriate characteristics may be used and the dimensions of the strip 10 may be changed. The platen 12 preferably incorporates a conventional vacuum holding arrangement whereby a partial vacuum is drawn in any convenient way (not shown) under the strip 10 near the scribing tool 14. The latter preferably is a conventional diamond-tipped cutting tool of the type used to scribe lines in diffraction gratings, adjusted here to scribe a substantially square groove 16 in the strip 10 from one edge thereof to the other. It will be noted here in passing that, because the final product resulting from the process being described is intended to have a very large number of accurately positioned apertures corresponding to a similar number of accurately machined grooves such as the substantially square groove 16, the scribing tool 14 is preferably mounted on gas bearings in a machine having tolerances in the order of the tolerances encountered in optical work. The strip 10 is then repetitively moved in any convenient manner (not shown) along its length a predetermined amount (say 50 microns) and the scribing process is repeated until a desired length of the strip 10 is scribed. In passing it should be noted that a plurality of scribes to scribe 10 could be positioned in a known manner at stations along the length of the strip 10 to allow more than one square groove 16 to be formed at any particular time. It will also be noted that with the given thickness of the strip 10 and the given dimensions and spacing of the square grooves, 25% of the original material of the strip 10 is removed and maximum dimension of the field of view of the still to be completed channelplate will be approximately 1.15° (or 0.020 radians).

After scribing is completed the strip 10 is passed through a processing station 18, here arranged to black anodize the strip 10. Alternatively, according to the invention the processing station 18 could be arranged to reduce any oxide on the strip 10 and to coat the surface to prevent reoxidation if a reflective surface is desired for each foramen of the still to be completed channelplate or still alternatively a layer of a secondary emitter could be applied. After being passed through the processing station, the strip 10 is wound on a takeup spool 20 having a round bobbin 21 (to form the channelplate shown in FIG. 2A) or a flat bobbin 23 (to form the channelplate shown in FIG. 2B). Alternatively, predetermined lengths of the strip 10 may be cut by any convenient means (not shown) and the lengths stacked on top of each other (to form, in accordance with prior art, the channelplate shown in FIG. 2C). After winding or stacking, the final step (not shown) is to secure the almost complete channelplate in any convenient manner. That is to say, the rolled or stacked lengths of the strip 10 are inserted in a frame (not shown) or thermally bonded to provide a finished product which will maintain its desired shape. It will now be appreciated that the form of the completed channelplate shown in FIG. 2A is similar to the form of the channelplate shown in my copending application entitled "Optical Apparatus", Ser. No. 726,079, filed Sept. 23, 1976 and assigned to the same assignee as this application. It will also be appreciated that, because the channelplate in the just-cited application was fabricated by joining a large number of hollow glass tubes (each of which had to be treated so that its interior would be nonreflective), the just-described method of manufacture is easier to perform with a more desirable end product.

A moment's thought will make it clear to one of skill in the art that the present concept of forming a channelplate (wherein the entire length of each one of a large number of foramina is exposed during the manufacturing process) may be carried out in many ways other than the way described. For example, if the desired configuration of the final product is such that the foramina need not have the degree of straightness attained by following the described method, i.e. if it were satisfactory to allow each one of the foramina in the final product to be curved, the scribing tool 14 (or several such tools) could be mounted on rotatable arms and the strip 10 could be moved continuously or intermittently during the cutting process. Further, of course, it is obvious that the shape of each one of the substantially square grooves 16 may be changed to allow grooves to be made without scribing. Thus, the grooves may be made using laser cutting methods or by selectively melting portions of the strip 10. Still further, it will be obvious that the grooves may be filled with, for example, a vitreous material transparent (or substantially so) to the particular type of radiation to which the completed channelplate will be exposed. In view of the foregoing, it is felt that this invention should not be restricted to its disclosed embodiment, but rather should be limited only by the spirit and scope of the appended claims.

What is claimed is:

1. The method of fabricating a channelplate with a plurality of foramina extending therethrough, each one of such foramina defining an optical path, such method comprising the steps of:

(a) scribing a strip of a metallic foil to form a plurality of parallel indentations across the width of such strip, the number of such identations being equal to the desired number of foramina, each having a length equal to the width of such foil;

(b) treating the surfaces of the plurality of indentations and the strip to attain a desired optical characteristic of the walls of each one of the foramina; and (c) winding the treated strip on a bobbin of appropriate shape finally to form a coiled channelplate with foramina defined by said parallel indentations extending therethrough, such foramina being the only openings in such plate for the passage of optical energy therethrough.

2. The method as in claim 1 wherein treating is accomplished by rendering the surfaces of the plurality of parallel indentations, and the strip of metallic foil, substantially nonreflective to optical energy.

3. The method as in claim 1 wherein treating is accomplished by applying a material having a high coefficient of secondary emission at least to the surfaces of the plurality of indentations.

* * * * *